G. L. Hart,
Animal Trap.
No. 112,807.    Patented Mar. 21, 1871.

Witnesses.
L. Hafelin
Franklin Root

Inventor.
George L. Hart
by W. E. Simonds

United States Patent Office.

GEORGE L. HART, OF NEW BRITAIN, CONNECTICUT.

Letters Patent No. 112,807, dated March 21, 1871.

IMPROVEMENT IN MOUSE AND ANIMAL-TRAPS.

The Schedule referred to in these Letters Patent and making part of the same.

I, GEORGE L. HART, of New Britain, in the county of Hartford and State of Connecticut, have invented an Improved Mouse and Animal-Trap, of which the following is a specification.

Nature and Objects of the Invention.

My improvements are applied to that class of traps known among trap manufacturers as "wood-choker" traps; they consist in so attaching the lever to the spring-bow that when the bow is pressed down it carries the lever with it and makes what is called a "self-setting trap."

Also, in so constructing the bait-hook that it will stand perpendicular, a balanced bait-hook.

Also, in so constructing the lever that the hinge by which it is connected to the block may be a part of it, as may also the part which specially serves to attach the lever to the spring-bow.

Description of the Accompanying Drawing.

Figure 1:
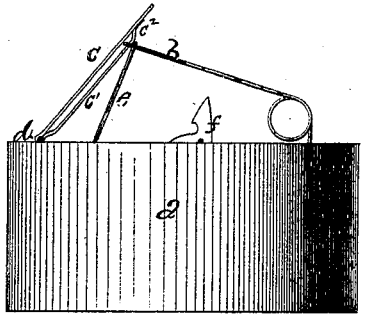
Figure 2:
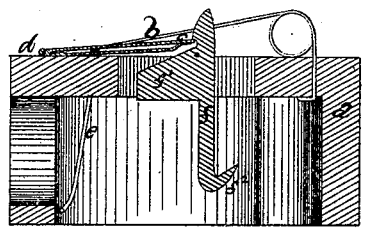
Figure 3:
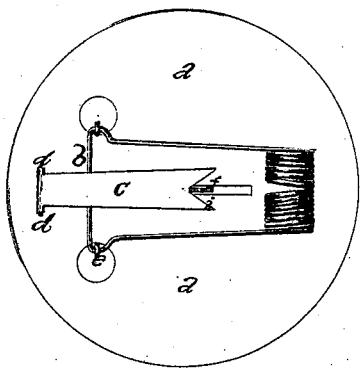

Figure 1 is a side elevation of the trap unset.
Figure 2 is a central vertical section of the trap set.
Figure 3 is a plan view of the trap set.

General Description.

The letter $a$ indicates the wooden block.
$b$, the spring-bow.
$c$, the lever, hinged to the block at $d$.
$e$, the choker.
$f$, the bait-hook.

The spring-bow in no wise differs from the ordinary article.

The lever is a piece of sheet metal of about the breadth and length shown, forked at the loose end by the fork $i$, so as to readily bring the top of the bait-hook to its center the more readily to make the trap self-setting.

At the point of attachment to the block the piece of metal which forms the lever is bent so as to surround the staple $d$, and then continues on, forming the loop $c^1$, which, at its upper extremity, $c^2$, is fastened to the under side of the lever.

The spring-bow is confined between and vibrates between the lever $c$ and the loop $c^1$, as it moves up and down, thus making the lever to move with it, so that when the spring-bow is pushed down so as to touch the block, the forked end of the lever will catch in the bait-hook and the trap will be set.

The bait-hook has a projection forward, $f^1$, designed to counterbalance the weight of the right-angled bottom of the hook $f^2$, which extends in an opposite direction, thus keeping the main stem of the trap always vertical when unset, and thus in better position for self-setting.

Also, if the top of the hook is canted backward when the lever comes down, the lever will strike upon this projection and bring the hook to place.

The loop $c^1$, instead of being in one continuous piece with the lever $c$, may be pressed down from it.

It is purposed to claim herein the lever $c$ independent of its forked end.

Claims.

I claim as my invention—

1. In a mouse or animal-trap the bait-hook $f$, having the counter-balance $f^1$, for the purpose set forth.

2. In a mouse or animal-trap, the combination of the spring-bow $b$ with the lever $c$ connected to it by means of the loop $c^1$, the whole constructed, arranged, and operated substantially as and for the purpose set forth.

GEORGE L. HART.

Witnesses:
W. E. SIMONDS,
FRANKLIN ROOT.